US012155775B2

(12) United States Patent
Testagrossa et al.

(10) Patent No.: US 12,155,775 B2
(45) Date of Patent: Nov. 26, 2024

(54) CRYPTOGRAPHIC AUTHENTICATION OF A PHYSICAL ASSET

(71) Applicant: FLIPKICK OF NEW YORK LIMITED LIABILITY COMPANY, New York, NY (US)

(72) Inventors: Robert Testagrossa, New York, NY (US); James Kirk Cropcho, New York, NY (US)

(73) Assignee: FLIPKICK OF NEW YORK LIMITED LIABILITY COMPANY, New York, NY (US)

( * ) Notice: Subject to any disclaimer, the term of this patent is extended or adjusted under 35 U.S.C. 154(b) by 296 days.

(21) Appl. No.: 17/660,517

(22) Filed: Apr. 25, 2022

(65) Prior Publication Data

US 2022/0345316 A1 Oct. 27, 2022

Related U.S. Application Data

(60) Provisional application No. 63/178,819, filed on Apr. 23, 2021.

(51) Int. Cl.
*H04L 9/32* (2006.01)

(52) U.S. Cl.
CPC .......... *H04L 9/3247* (2013.01); *H04L 9/3239* (2013.01)

(58) Field of Classification Search
CPC ....... H04L 9/3247; H04L 9/3239; H04L 9/50; H04L 2209/805
See application file for complete search history.

(56) References Cited

U.S. PATENT DOCUMENTS

| 7,180,419 | B2 | 2/2007 | Oakes et al. |
| 7,322,520 | B2 | 1/2008 | Warden et al. |
| 9,591,451 | B1 * | 3/2017 | Knight ............. H04M 1/72412 |
| 10,505,726 | B1 | 12/2019 | Andon et al. |

(Continued)

FOREIGN PATENT DOCUMENTS

KR 102355550 B1 2/2022

OTHER PUBLICATIONS

Blue Bite; Applications: Digitize Your Products; retrieved from <https://www.bluebite.com/applications> on Sep. 9, 2022, 3 pages.

(Continued)

*Primary Examiner* — Brian F Shaw
(74) *Attorney, Agent, or Firm* — Lando & Anastasi, LLP (57) ABSTRACT

Techniques for cryptographic authentication of a physical asset are disclosed, including: operating a trusted application, provided by a trusted entity, on a computing device equipped with an NFC reader to: (a) obtain a single-use authentication link from a cryptographically-secure NFC chip attached to a physical asset; (b) obtain a metadata pointer and a hash digest from the single-use authentication link; (c) obtain, via the metadata pointer, metadata associated with the physical asset, the metadata including a cryptographic signature; (d) obtain a public authentication key associated with the trusted entity; and (e) authenticate the cryptographic signature against the public authentication key and verify whether the hash digest is a cryptographic hash of the metadata obtained via the metadata pointer to obtain an authentication result for the physical asset.

34 Claims, 6 Drawing Sheets

(56) References Cited

U.S. PATENT DOCUMENTS

| | | | |
|---|---|---|---|
| 10,803,690 | B2 | 10/2020 | Meadow |
| 2012/0207305 | A1* | 8/2012 | Gallo .................... H04L 61/00 380/271 |
| 2013/0217333 | A1 | 8/2013 | Sprigg et al. |
| 2019/0213699 | A1 | 7/2019 | Branscomb et al. |
| 2020/0151738 | A1* | 5/2020 | Guinard ............. G06Q 30/0185 |
| 2021/0256070 | A1 | 8/2021 | Tran et al. |
| 2021/0306807 | A1 | 9/2021 | Kashani-Nejad et al. |

OTHER PUBLICATIONS

Blue Bite; Platform information page; retrieved from <https://www.bluebite.com/> on Sep. 9, 2022, 5 pages.

Blue Bite; Product Commerce; retrieved from <https://www.bluebite.com/product-commerce> on Sep. 9, 2022. 4 pages.

Blue Bite; The Complete Guide to NFC; Aug. 2018; retrieved from <https://www.bluebite.com/nfc> on Sep. 9, 2022; 7 pages.

NXP Semiconductors; NT4H2421Tx Product Data Sheet: NTAG 424 DNA TT—Secure NFC T4T compliant IC with Tag Tamper feature, Rev. 3.0; Jan. 31, 2019; <https://www.nxp.com/docs/en/data-sheet/NT4H2421Tx.pdf>; 102 pages.

QLIKTAG; Product Authentication & Anti Counterfeit Solution with IoT: Brand Protection & Anti Counterfeiting; retrieved from <https://www.qliktag.com/product-authentication-2/> on Apr. 25, 2022; 5 pages.

The Fine Art Ledger, LLC; Art Blockchain from The Fine Art Ledger; retrieved from <https://www.thefineartledger.com/> on Apr. 25, 2022; 6 pages.

Blue Bite; "The Fine Art Ledger"; retrieved from <https://web.archive.org/web/20220705125203/https://www.bluebite.com/case-studies/the-fine-art-ledger> on Oct. 21, 2024, dated 2019, 7 pages.

The Fine Art Ledger, LLC; "How It Works"; retrieved from <https://web.archive.org/web/20220521085145/https://www.thefineartledger.com/how-it-works> on Oct. 21, 2024, dated 2022, 2 pages.

Variuscard GmbH; "NTAG 424 DNA: The latest chip for security, data privacy and trust for IoT and NFC applications"; retrieved from <https://web.archive.org/web/20221003071335/https://www.variuscard.com/plastic-cards/smartcard-rfid-nfc-mifare/nxp-ntag-424-dna-nfc/?lang=en#tab-id-6> on Oct. 21, 2024, dated 2022, 8 pages.

\* cited by examiner

CRYPTOGRAPHIC AUTHENTICATION OF A PHYSICAL ASSET

CROSS REFERENCE TO RELATED APPLICATIONS

This patent application claims the benefit of priority under 35 U.S.C. § 119(e) to U.S. Provisional Patent Application No. 63/178,819 filed on Apr. 23, 2021, entitled, "CRYPTOGRAPHIC AUTHENTICATION OF A PHYSICAL ASSET," the contents and teachings of which are hereby incorporated by reference in their entirety.

BACKGROUND

A non-fungible token (NFT) is a unique data item ("token") associated with a digital asset (e.g., digital art, collectibles, games, music, videos such as sports highlights, etc.) and stored on a blockchain. A blockchain is a secure digital ledger, typically implemented in a distributed peer-to-peer network. An NFT associated with a particular digital asset certifies that the digital asset is unique. Unlike units of cryptocurrencies (e.g., bitcoins), NFTs are not interchangeable; hence their designation as "non-fungible."

It is often desirable to verify the authenticity of a physical asset. For example, because physical artwork is susceptible to forgery, it is often desirable to verify that a particular piece of art is the original and not a forgery. Conventional techniques for detecting forgeries rely on expert analysis of materials used (e.g., canvas type, pigment type, etc.), artistic styles (e.g., brushstrokes, color selection, etc.), and other physical features of the artwork itself. Detecting forgeries may also use imaging to reveal hidden forgery techniques (e.g., reused canvas, touch-ups not visible to the human eye, gridlines used to guide the forger's replication efforts, etc.).

It also often desirable for one party to verify that another party is physically present in a particular location. Conventional techniques for doing so may involve the use of the Global Positioning System (GPS) and a secure application that transmits GPS coordinates to the other party.

Approaches described in this section have not necessarily been conceived and/or pursued by others prior to the filing of this application. Accordingly, unless otherwise indicated, approaches described in this section should not be construed as prior art.

TECHNICAL FIELD

The present disclosure relates generally to authenticating physical assets.

SUMMARY

Unfortunately, the above-described approaches may suffer from deficiencies. For example, conventional techniques for authenticating physical assets are time-consuming, error-prone, and require considerable subject matter expertise and/or expensive scientific equipment.

As another example, conventional GPS techniques for verifying that a party is physically present in a particular location are limited by the accuracy of GPS, typically no more accurate than about 5 meters, and even less accurate indoors. In addition, although GPS is capable of detecting altitude, GPS altitude calculations are often even less precise. Thus, it is quite difficult, if not impossible, to establish on what floor of a building a device is located.

Thus, it would be desirable to implement techniques for authenticating physical assets that are not time-consuming, error-prone, or require considerable subject matter expertise and/or expensive scientific equipment. In addition, it would also be desirable to implement techniques for verifying that a party is physically present in a particular location that are not limited by the deficiencies of GPS. Both of these results may be accomplished using a cryptographically-secure NFC chip in connection with an application running on a computing device (e.g., a mobile device).

In one embodiment, a method is provided. The method includes operating a trusted application, the trusted application being provided by a trusted entity, on a computing device equipped with a near-field communications (NFC) reader to: (a) obtain a single-use authentication link from a cryptographically-secure NFC chip attached to a physical asset; (b) obtain a metadata pointer and a hash digest from the single-use authentication link; (c) obtain, via the metadata pointer, metadata associated with the physical asset, the metadata including a cryptographic signature; (d) obtain a public authentication key associated with the trusted entity; and (e) authenticate the cryptographic signature against the public authentication key and verify whether the hash digest is a cryptographic hash of the metadata obtained via the metadata pointer to obtain an authentication result for the physical asset. In an embodiment, obtaining the metadata pointer and the hash digest from the single-use authentication link includes: requesting, from a web server, an authentication page pointed to by the single-use authentication link; and loading the authentication page from the web server, the authentication page including the metadata pointer and the hash digest. In an embodiment, the method further includes presenting the authentication result in the authentication page. In an embodiment, the method further includes: detecting, by the authentication page, a user selection of an authentication control; and authenticating the cryptographic signature being performed responsive to detecting the user selection of the authentication control. In an embodiment, the cryptographically-secure NFC chip is attached to the physical asset using a sticker. In an embodiment, the physical asset is a piece of artwork.

In another embodiment, a computer program product comprising a non-transitory computer-readable storage medium storing a set of instructions is provided. When the instructions are executed by a computing device equipped with an NFC reader, they cause the computing device to operate a trusted application provided by a trusted entity to: (a) obtain a single-use authentication link from a cryptographically-secure NFC chip attached to a physical asset; (b) obtain a metadata pointer and a hash digest from the single-use authentication link; (c) obtain, via the metadata pointer, metadata associated with the physical asset, the metadata including a cryptographic signature; (d) obtain a public authentication key associated with the trusted entity; and (e) authenticate the cryptographic signature against the public authentication key and verify whether the hash digest is a cryptographic hash of the metadata obtained via the metadata pointer to obtain an authentication result for the physical asset. In an embodiment, obtaining the metadata pointer and the hash digest from the single-use authentication link includes: requesting, from a web server, an authentication page pointed to by the single-use authentication link; and loading the authentication page from the web server, the authentication page including the metadata pointer and the hash digest. In an embodiment, the instructions further cause the computing device to present the authentication result in the authentication page. In an embodiment, the instructions further cause the computing device to detect, by the authentication page, a user selection of an authentication control; and authenticating the cryptographic signature is performed responsive to detecting the user selection of the authentication control. In an embodiment, the cryptographically-secure NFC chip is attached to the physical asset using a sticker. In an embodiment, the physical asset is a piece of artwork.

In another embodiment, an apparatus is provided. The apparatus includes an NFC reader and processing circuitry coupled to memory configured to operate a trusted application provided by a trusted entity to: (a) obtain a single-use authentication link from a cryptographically-secure NFC chip attached to a physical asset; (b) obtain a metadata pointer and a hash digest from the single-use authentication link; (c) obtain, via the metadata pointer, metadata associated with the physical asset, the metadata including a cryptographic signature; (d) obtain a public authentication key associated with the trusted entity; and (e) authenticate the cryptographic signature against the public authentication key and verify whether the hash digest is a cryptographic hash of the metadata obtained via the metadata pointer to obtain an authentication result for the physical asset. In an embodiment, the apparatus further includes network interface circuitry communicatively-connected to a network; and obtaining the metadata pointer and the hash digest from the single-use authentication link includes: requesting, from a web server, an authentication page pointed to by the single-use authentication link; and loading the authentication page from the web server, the authentication page including the metadata pointer and the hash digest. In an embodiment, the processing circuitry coupled to memory is further configured to present the authentication result in the authentication page. In an embodiment, the processing circuitry coupled to memory is further configured to detect, by the authentication page, a user selection of an authentication control; and authenticating the cryptographic signature is performed responsive to detecting the user selection of the authentication control. In an embodiment, the cryptographically-secure NFC chip is attached to the physical asset using a sticker. In an embodiment, the physical asset is a piece of artwork.

In another embodiment, a method for a first computing device equipped with an NFC reader to verify its location to a second computing device is provided. The method includes: (1) obtaining, by the first computing device, a single-use authentication link from a cryptographically-secure NFC chip securely located in a particular location; (2) sending the single-use authentication link from the first computing device to the second computing device; (3) obtaining, by the second computing device, a metadata pointer and a hash digest from the single-use authentication link; (4) obtaining, by the second computing device via the metadata pointer, metadata associated with the particular location, the metadata including a cryptographic signature; (5) obtaining, by the second computing device, a public authentication key associated with a trusted entity; and (6) authenticating, by the second computing device, the cryptographic signature against the public authentication key and verifying whether the hash digest is a cryptographic hash of the metadata obtained via the metadata pointer to obtain a verification result for whether the first computing device was located at the particular location. In an embodiment, the particular location is one of a set of locations specified for a scavenger hunt. In an embodiment, the particular location is one of a set of locations specified for a sweepstakes. In an embodiment, the particular location is an office of a parole officer; and the first computing device is a mobile device operated by a parolee assigned to the parole officer. In an embodiment, the particular location is an office of an employer, presence within the office being restricted to persons employed by the employer; the first computing device is a mobile device operated by an employee of the employer; and the employee initiates the method in order to prove to a third party in control of the second computing device that the employee is employed by the employer. In an embodiment, the particular location is an office of an employer; the first computing device is a mobile device operated by an employee of the employer; and the employee initiates the method in order to prove to the employer that the employee was located within the office of the employer during working hours. In an embodiment, the particular location is within an art gallery in which a piece of artwork is stored, the piece of artwork being subject to a smart contract indicating that a user is able to mint a non-fungible token (NFT) based on the piece of artwork when in the presence of the artwork, subject to additional conditions; the first computing device is a mobile device operated by a person seeking to mint the NFT; and the method further includes minting the NFT in response to the verification result indicating that the first computing device was located at the particular location, subject to the additional conditions. In an embodiment, obtaining the metadata pointer and the hash digest from the single-use authentication link includes: requesting, from a web server, an authentication page pointed to by the single-use authentication link; and loading the authentication page from the web server, the authentication page including the metadata pointer and the hash digest.

In another embodiment, a system is provided. The system includes: (A) a first computing device equipped with a near-field communications (NFC) reader, the first computing device being configured to: (1) obtain a single-use authentication link from a cryptographically-secure NFC chip securely located in a particular location; and (2) send the single-use authentication link from the first computing device to the second computing device; and (B) the second computing device, the second computing device being configured to: (3) obtain a metadata pointer and a hash digest from the single-use authentication link; (4) obtain, via the metadata pointer, metadata associated with the particular location, the metadata including a cryptographic signature; (5) obtain a public authentication key associated with a trusted entity; and (6) authenticate the cryptographic signature against the public authentication key and verify whether the hash digest is a cryptographic hash of the metadata obtained via the metadata pointer to obtain a verification result for whether the first computing device was located at the particular location. In an embodiment, the particular location is one of a set of locations specified for a scavenger hunt. In an embodiment, the particular location is one of a set of locations specified for a sweepstakes. In an embodiment, the particular location is an office of a parole officer; and the first computing device is a mobile device operated by a parolee assigned to the parole officer. In an embodiment, the particular location is an office of an employer, presence within the office being restricted to persons employed by the employer; the first computing device is a mobile device operated by an employee of the employer; and the employee activates the NFC reader in order to prove to a third party in control of the second computing device that the employee is employed by the employer. In an embodiment, the particular location is an office of an employer; the first computing device is a mobile device operated by an employee of the employer; and the employee activates the NFC reader in order to prove to the employer that the employee was located within the office of the employer during working hours. In an embodiment, the particular location is within an art gallery in which a piece of artwork is stored, the piece of artwork being subject to a smart contract indicating that a user is able to mint a non-fungible token (NFT) based on the piece of artwork when in the presence of the artwork, subject to additional conditions; the first computing device is a mobile device operated by a person seeking to mint the NFT; and the second computing device is further configured to mint the NFT in response to the verification result indicating that the first computing device was located at the particular location, subject to the additional conditions. In an embodiment, obtaining the metadata pointer and the hash digest from the single-use authentication link includes: requesting, from a web server, an authentication page pointed to by the single-use authentication link; and loading the authentication page from the web server, the authentication page including the metadata pointer and the hash digest.

In another embodiment, a computer program product comprising a non-transitory computer-readable storage medium storing a set of instructions is provided. When the instructions are executed by a computing device, they cause the computing device to: (I) receive a single-use authentication link from another computing device, the single-use authentication link having been obtained by the other computing device from a cryptographically-secure near-field communications (NFC) chip securely located in a particular location using an NFC reader of the other computing device; (II) obtain a metadata pointer and a hash digest from the single-use authentication link; (III) obtain, via the metadata pointer, metadata associated with the particular location, the metadata including a cryptographic signature; (IV) obtain a public authentication key associated with a trusted entity; and (V) authenticate the cryptographic signature against the public authentication key and verify whether the hash digest is a cryptographic hash of the metadata obtained via the metadata pointer to obtain a verification result for whether the other computing device was located at the particular location. In an embodiment, the particular location is one of a set of locations specified for a scavenger hunt. In an embodiment, the particular location is one of a set of locations specified for a sweepstakes. In an embodiment, the particular location is an office of a parole officer; and the other computing device is a mobile device operated by a parolee assigned to the parole officer. In an embodiment, the particular location is an office of an employer, presence within the office being restricted to persons employed by the employer; the other computing device is a mobile device operated by an employee of the employer; and the employee activates the NFC reader in order to prove to a third party in control of the computing device that the employee is employed by the employer. In an embodiment, the particular location is an office of an employer; the other computing device is a mobile device operated by an employee of the employer; and the employee activates the NFC reader in order to prove to the employer that the employee was located within the office of the employer during working hours. In an embodiment, the particular location is within an art gallery in which a piece of artwork is stored, the piece of artwork being subject to a smart contract indicating that a user is able to mint a non-fungible token (NFT) based on the piece of artwork when in the presence of the artwork, subject to additional conditions; the other computing device is a mobile device operated by a person seeking to mint the NFT; and the computing device is further configured to mint the NFT in response to the verification result indicating that the other computing device was located at the particular location, subject to the additional conditions. In an embodiment, obtaining the metadata pointer and the hash digest from the single-use authentication link includes: requesting, from a web server, an authentication page pointed to by the single-use authentication link; and loading the authentication page from the web server, the authentication page including the metadata pointer and the hash digest.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures.

DETAILED DESCRIPTION

Techniques for utilizing a cryptographically-secure near-field communication (NFC) chip for authentication are provided herein in multiple embodiments.

In one set of embodiments, cryptographic authentication of a physical asset is disclosed. Authenticating a physical asset can help ensure that the physical asset is authentic, i.e., that it is what it is proposed to be. For example, techniques used herein may be used to authenticate artwork. After a physical asset has been created, or after it has been authenticated using another approach, a cryptographically-secure NFC chip may be attached to the physical asset and used thereafter to authenticate the physical asset. Thus, techniques described herein may help (1) avoid the cost in time, required expertise, and/or specialized equipment often required to authenticate a physical asset, (2) preserve the value of a physical asset, by ensuring that no value is removed by reason of doubting its authenticity, and/or (3) facilitate the sale or other transfer of ownership of the physical asset from one entity to another, by removing the question of authenticity as a possible obstacle to the sale or other transfer. Techniques described herein can be performed using any device that includes an NFC reader and an authentication application, thus making authentication of physical assets readily available without requiring expensive, specialized hardware. The techniques described herein, by virtue of using NFC and web-based technologies, can be performed very quickly, thus allowing for rapid authentication whenever the physical asset is physically accessible.

In another set of embodiments, a system and method is provided for authenticating that a first computing device is physically present in or immediately adjacent to a particular physical location. Such authentication or location verification may provide various opportunities. For example, such a system may be used to provide proof of location in a location-based scavenger hunt. As another example, such a system may be used to provide proof of location for a promotional sweepstakes requiring a customer to visit every branch of a chain store or restaurant. As another example, such a system may be used to provide proof of location for a parolee having visited a parole officer. As another example, such a system may be used to provide proof of employment by a particular company having a restricted office location only open to employees. As another example, such a system may be used to provide proof of presence of an employee within an office during working hours. As another example, such a system may be used to provide proof of location in order to mint a non-fungible token (NFT) associated with the first N users to visit a piece of artwork displayed at a particular gallery.

1. System Architecture

Figure 1:
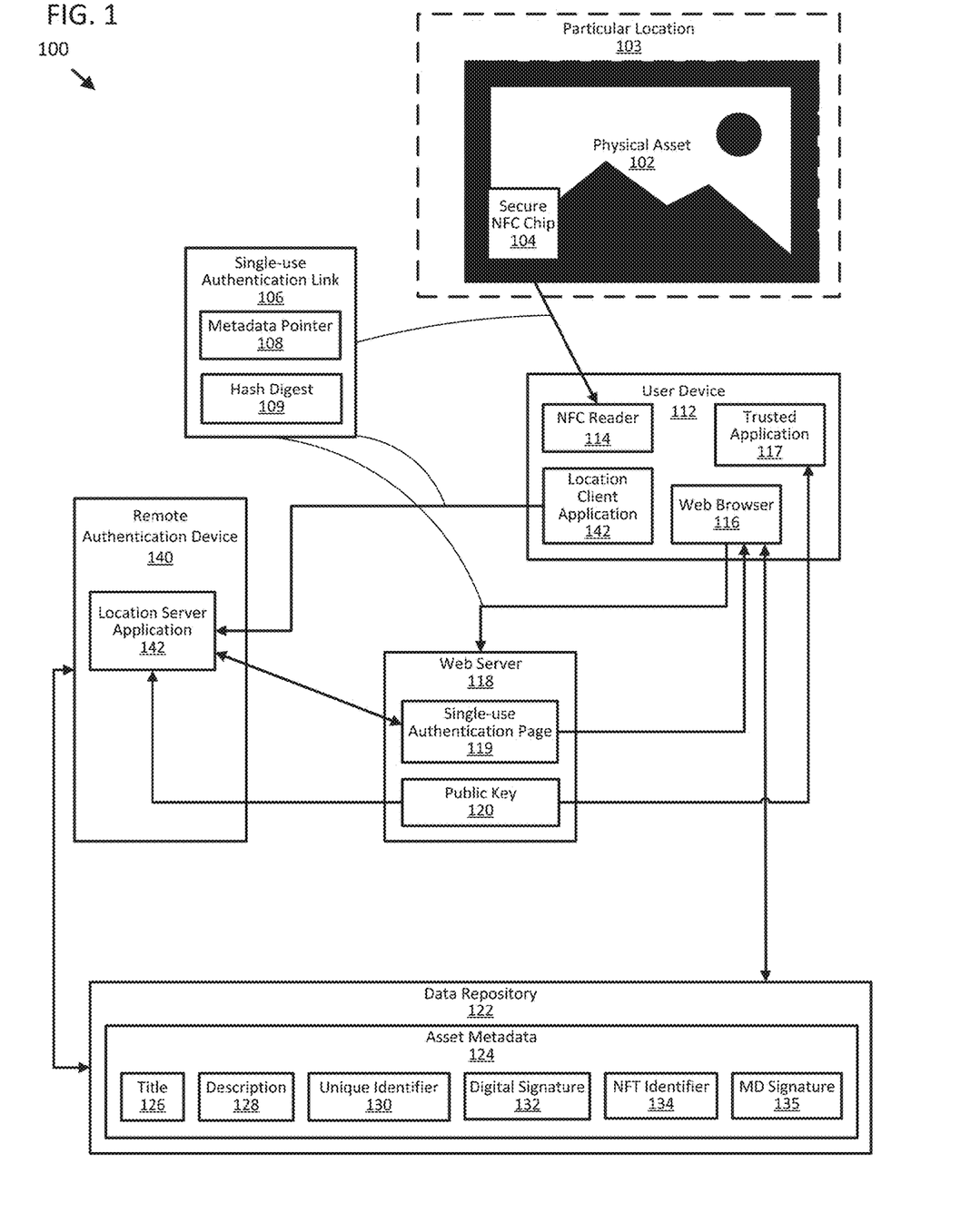
FIG. 1 is a block diagram of an example of a system according to an example embodiment.

FIG. 1 is a block diagram of an example of a system 100 according to an example embodiment. The system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

As illustrated in FIG. 1, a cryptographically-secure near-field communication (NFC) chip 104 may be attached to a physical asset 102. The physical asset 102 may be any kind of item that it may be desirable to authenticate. For example, the physical asset 102 may be a piece of artwork, a collectible, a souvenir, or another kind of item. The cryptographically-secure NFC chip 104 may be attached to the physical asset 102 as a sticker, sewn on, fastened using one or more security screws or fixed fasteners, and/or in one or more other ways designed to make removal of NFC chip 104 from the physical asset 102 difficult or impossible. In some cases (e.g., a strong sticker fastened to a painting canvas), it may not be possible to remove the NFC chip 104 from the physical asset 102 without damaging the physical asset 102.

The cryptographically-secure NFC chip 104 includes hardware and/or software configured to provide data when an NFC reader 114 is nearby, i.e., within the near-field range supported by the NFC chip 104 and NFC reader 114. For example, the NFC chip 104 and NFC reader 114 may be configured to communicate according to ISO/IEC 18000-3 and/or another NFC standard. The NFC reader 114 may be configured to activate the NFC chip 104 using a radio frequency (RF) field, and the NFC chip 104 may be configured to provide data to the NFC reader 114 responsive to being activated. In an example embodiment, cryptographically-secure NFC chip 104 may be an NTAG® 424 DNA produced by NXP Semiconductors N.V. of the Netherlands. In another example embodiment, cryptographically-secure NFC chip 104 may be an NTAG 424 DNA TagTamper tag, which includes a feature that detects tampering.

Cryptographically-secure NFC chip 104 stores a metadata pointer 108, which indicates the location of asset metadata 124 associated with the physical asset 102. Cryptographically-secure NFC chip 104 may also store a hash digest 109 of the contents of the metadata pointed to by metadata pointer 108. Hash digest 109 may be generated using a cryptographic hash function, such as, for example, MD5, SHA-1, SHA-2, SHA-3, or any similar algorithm. Cryptographically-secure NFC chip 104 also stores information that allows it to generate a single-use authentication link 106, which is a uniform resource locator (URL) of an authentication page 119 to be served to a web browser 116 at the user device 112. This information may include one or more encryption keys, a counter, a host name portion of the URL, and an asset identifier uniquely associated with the physical asset 102. In order to generate the single-use authentication link 106, cryptographically-secure NFC chip 104 may combine the asset identifier, the counter, and the metadata pointer 108, encrypt the combination with one of the encryption keys, and then append the encrypted value to the host name (and the counter value) as the path of the URL. Afterwards, the counter may be incremented.

A user device 112 may be any kind of device that includes an NFC reader 114. For example, the user device 112 may be a smartphone, tablet, laptop, a device specifically manufactured for authenticating physical assets (e.g., a dedicated handheld device having a built-in NFC reader 114 and a screen), or another kind of device that includes an NFC reader 114.

The user device 112 includes a web browser 116 configured to load the authentication page 119 designated by the authentication link 106. When loaded in the web browser 116, the authentication page 119 provides a web-based application for authenticating the physical asset 102. User device 112 also uses a separate installable trusted software application 117 (e.g., a mobile "app" or other kind of application) that may operate either on its own or in conjunction with web browser 116. Trusted application 117 may be downloaded from a trusted entity in order to avoid a scenario in which a counterfeiter installs a phony NFC chip on a phony physical asset with the phony NFC chip configured to provide a single-use authentication link 106 that points to a counterfeit authentication page that, upon being loaded into web browser 116, provides an authentication even though it is a counterfeit.

A web server 118 refers to hardware and/or software configured to serve up an authentication page 116 that the user device 116 uses to authenticate the physical asset 102. The web server 118 may also be configured to store a public key 120. For example, the public key 120 may be a Pretty Good Privacy (PGP) key or another kind of public key. The web server 118 may be configured to provide the public key 120 to the user device 112, as part of the authentication page 119 and/or responsive to a separate request.

A data repository 112 is configured to store asset metadata 124 associated with the physical asset 102. Specifically, the asset metadata 124 includes information used to authenticate the physical asset 102. The asset metadata 124 may also include information that describes the physical asset 102. For example, the asset metadata 124 may include one or more of: a title 126 of the physical asset 102; a description 128 of the physical asset 102; a unique identifier 130 associated with the physical asset 102 (e.g., a globally unique identifier provided by Flipkick of New York, LLC, and/or another kind of unique identifier); a digital signature 132 associated with the physical asset 102 (e.g., a cryptographic signature of the unique identifier 130); an NFT identifier 134 (e.g., if the digital asset 102 is also associated with an NFT); and/or another kind of metadata associated with the physical asset 102 or combination thereof. The data repository 122 may be configured to store asset metadata 124 for any number of physical assets.

In general, the data repository 122 may be any type of storage unit and/or device (e.g., a file system, database, collection of tables, or any other storage mechanism) for storing data. The data repository 122 may be stored in a distributed file system, such as InterPlanetary File System (IPFS), and/or another kind of distributed file system. A data repository 122 may include multiple different storage units and/or devices. The multiple different storage units and/or devices may or may not be of the same type or located at the same physical site. Further, a data repository 122 may be implemented or may execute on the same computing system as one or more other components of the system 100. Alternatively or additionally, a data repository 122 may be implemented or executed on a computing system separate from one or more other components of the system 100. A data repository 122 may be logically integrated with one or more other components of the system 100. Alternatively or additionally, a data repository 122 may be communicatively coupled to one or more other components of the system 100 via a direct connection or via a network. In FIG. 1, a data repository 122 is illustrated as storing various kinds of information. Some or all of this information may be implemented and/or distributed across any of the components of the system 100. However, this information is illustrated within the data repository 122 for purposes of clarity and explanation.

In some embodiments, system 100 may also include a remote authentication device 140 that is configured to execute a location server application 142 that interfaces with a location client application running on the user device 112 to verify whether the user device 112 is in close proximity to a particular location 103 in which cryptographically-secure NFC chip 104 is securely located (e.g., bolted down, stored in a locked room or cabinet, etc.). In some embodiments, remote authentication device 140 may also include a web browser 116, which may operate in conjunction with location server application 142.

In an example embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

2. Example Authentication Page

Figure 2:
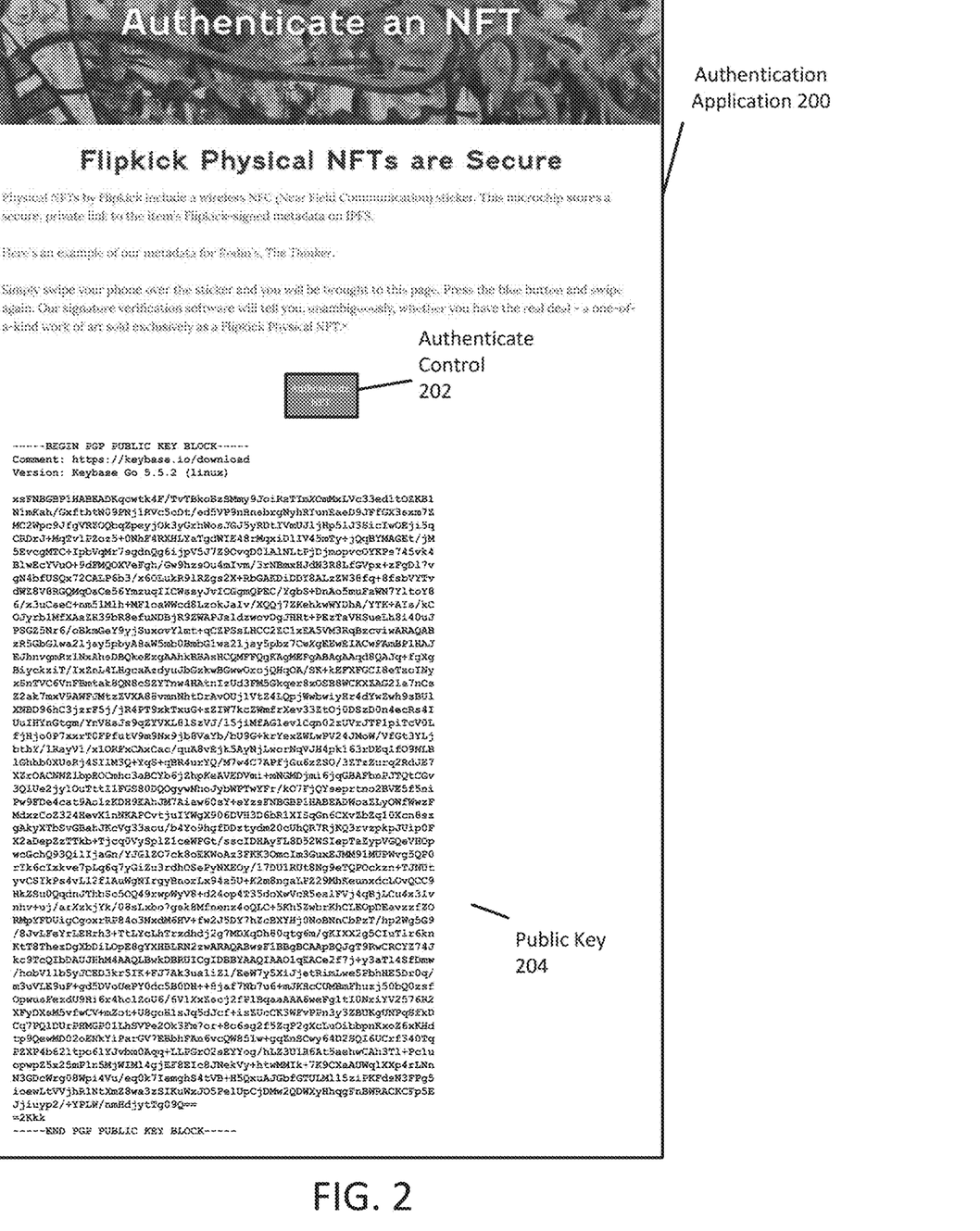
FIG. 2 illustrates an example of an authentication page according to an example embodiment.

FIG. 2 illustrates an example of an authentication page 200 according to an example embodiment. Components and/or operations described with respect to FIG. 2 should be understood as examples that may not be applicable to one or more embodiments. Accordingly, components and/or operations described below should not be construed as limiting the scope of one or more embodiments The illustration shown in FIG. 2 includes only user interface elements of the authentication page 200 that are visible to the user. The authentication page 200 also includes client-side scripting (e.g., in JavaScript® and/or another client-side scripting language) that is not visible to the user. The authentication page 200 includes an authentication control 202 that, when selected by a user, uses client-side scripting to initiate authentication as described in further detail below. The authentication page 200 also includes a public key 204 (in this example, a PGP key) to be used in authentication. In FIG. 2, the public key 204 is visible to the user on the authentication page 200. Alternatively, the public key 204 may be hidden. For example, the public key 204 may be hidden in hypertext markup language (HTML) META elements that are not rendered on the screen or fetched from the web server 118 by client-side scripting without rendering the public key 204 on the screen.

3. Operations for Cryptographic Authentication of a Physical Element

Figure 3:
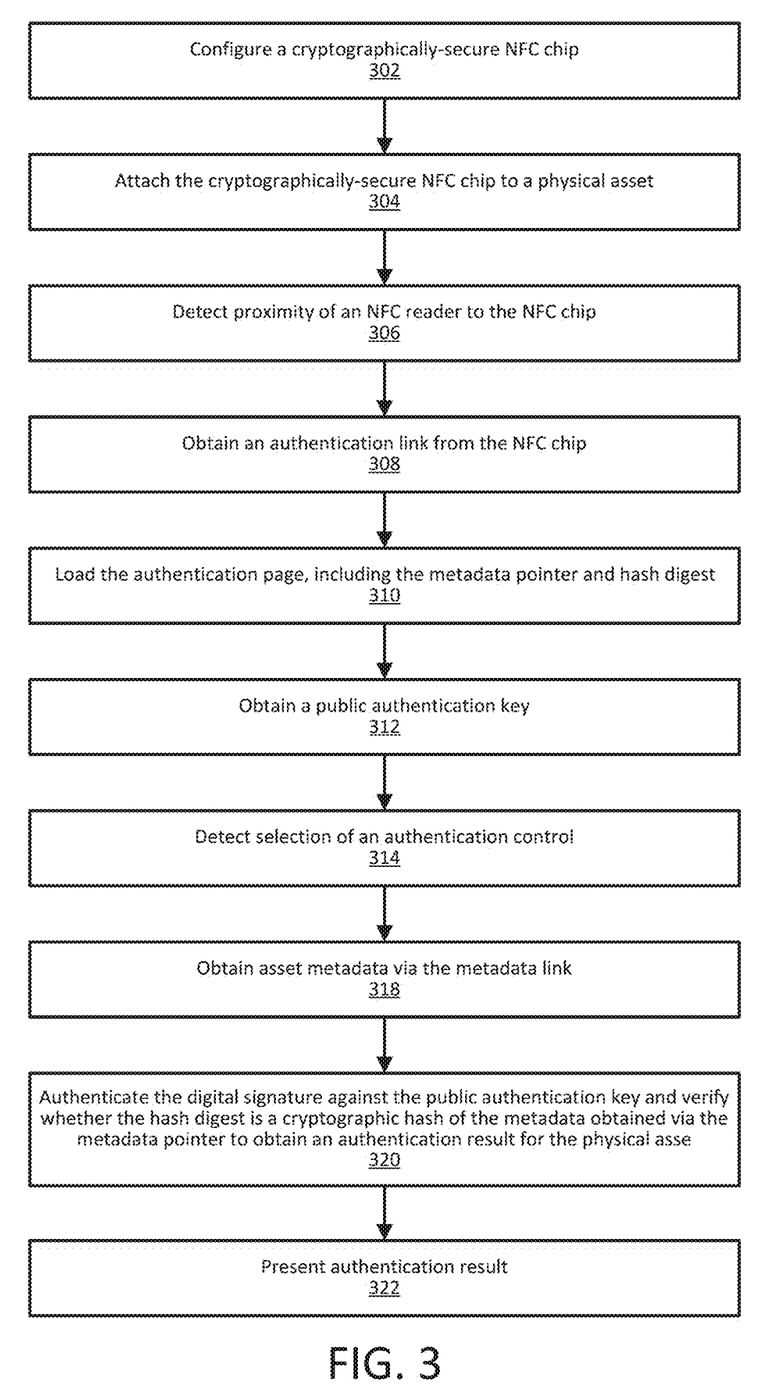
FIG. 3 is a flow diagram of an example of operations for cryptographic authentication of a physical asset according to an example embodiment.

FIG. 3 is a flow diagram of an example of operations for cryptographic authentication of a physical asset according to an example embodiment. One or more operations illustrated in FIG. 3 may be modified, rearranged, or omitted all together. Accordingly, the particular sequence of operations illustrated in FIG. 3 should not be construed as limiting the scope of one or more embodiments.

In an example embodiment, a cryptographically-secure NFC chip 104 is configured (Operation 302) to be associated with a physical asset 102. Configuring the NFC chip 104 may include generating and storing metadata 124 associated with the physical asset 102 in a data repository 122, and storing a pointer 108 to the location of the metadata 124 in the NFC chip 104. Configuring the NFC chip 104 may also include calculating the hash digest 109 using the metadata 124 and storing the calculated hash digest 109 in the NFC chip 104. Configuring the NFC chip 104 may also include storing the asset identifier, the host name of the web server 118, an initial counter value, and the one or more encryption keys in the NFC chip 104.

The NFC chip 104 is attached to the physical asset 102 (Operation 304). The NFC chip 104 may be attached to the physical asset 102 as a sticker, sewn on, fastened using one or more security screws or fixed fasteners, and/or in one or more other ways designed to make removal of NFC chip 104 from the physical asset 102 difficult or impossible. In some cases (e.g., a strong sticker fastened to a painting canvas), it may not be possible to remove the NFC chip 104 from the physical asset 102 without damaging the physical asset 102.

After the NFC chip 104 is attached to the physical asset 102, proximity of an NFC reader 114 to the NFC chip 104 is detected (Operation 306). To detect proximity of the NFC reader 114 to the NFC chip 104, the NFC reader 114 may emit an RF field and/or other signal that activates the NFC chip 104. Responsive to being activated, the NFC chip 104 may transmit a response to the NFC reader 114. This operation may also be referred to as the NFC reader 114 "scanning" or "swiping" the NFC chip 104.

The NFC reader 114 obtains a single-use authentication link 106 from the NFC chip 114 (Operation 308). The user device 112 follows the authentication link 106 to web server 118 and loads the authentication page 119, 200 in a web browser 116 (Operation 310). This operation 310 may also include obtaining the metadata pointer 108 and hash digest 109 from the web server 118.

The user device 112 also obtains a public authentication key 120 from the web server 118 (Operation 312), either as part of the authentication page 119 or in a separate request.

When the authentication page 119 is loaded in the web browser 116 at the user device 112, the authentication page 119 detects that a user has selected an authentication control 202 (Operation 314). An example of an authentication control 202 is described above with reference to FIG. 2. Responsive to detecting selection of the authentication control 202, the authentication page 119 follows the metadata pointer 108 to obtain asset metadata 124 associated with the physical asset 102 (Operation 318).

The metadata pointer 108 may be, for example, a link to an IPFS storage location. Securely embedding the metadata pointer 108 within the single-use authentication page 119 may help keep the metadata pointer 108 secret, protecting the metadata 124 from unauthorized access.

The metadata 124 may also include a digital signature 135 (e.g., a cryptographic signature of the unique identifier 130 or a combination of two or more of the metadata elements 126, 128, 130, 132, 134).

The authentication page 119 authenticates the digital signature 132 against the public authentication key 120 and also verifies whether the hash digest 109 is a correct cryptographic hash of the metadata 124 obtained via the metadata pointer 108 to obtain an authentication result for the physical asset 102 (Operation 320). If both the authentication of the digital signature 132 and the verification of the hash digest 109 succeed, then the authentication result is affirmative. If either or both of the authentication of the digital signature 132 or the verification of the hash digest 109 fail, then the authentication result is negative. Failure of the authentication of the digital signature 132 may indicate that the metadata 124 has been tampered with. Failure of the verification of the hash digest 109 may indicate that the NFC chip 104 has been tampered with or that the NFC chip 104 is counterfeit. Authentication result indicates whether the physical asset 102 is authenticated.

The authentication step (Operation 320) is performed by the trusted application 117 in order to ensure that the NFC chip 104 does not contain a link to a counterfeit authentication page 119 that fails to perform the authentication correctly.

The authentication page 119 presents the authentication result (Operation 322). For example, the authentication page may show, "Authenticated!" if authentication is successful, or "Unable to authenticate!" if authentication is unsuccessful.

Figure 4:
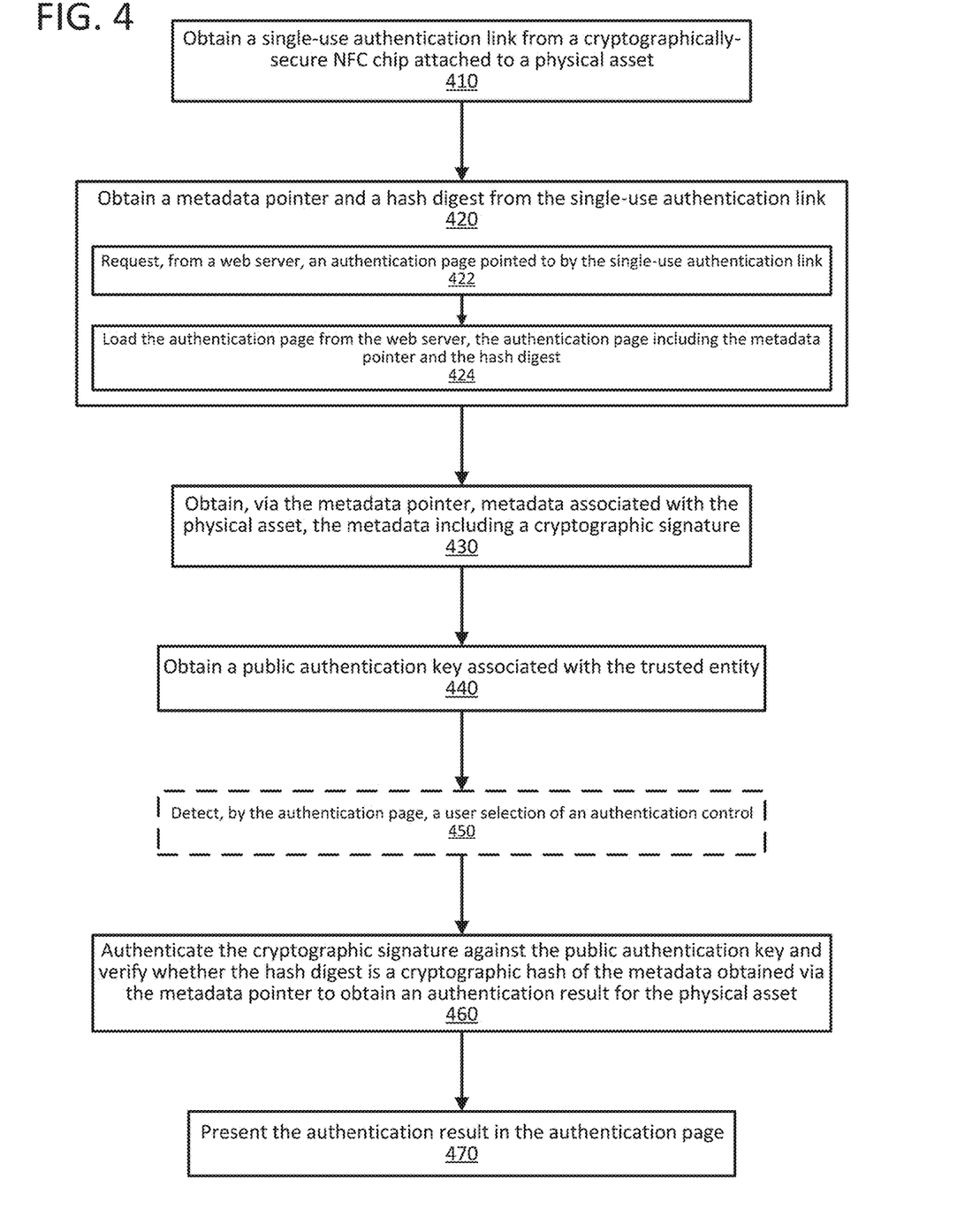
FIG. 4 is a flow diagram of an example of operations for cryptographic authentication of a physical asset according to an example embodiment.

FIG. 4 is another flow diagram of an example of operations for cryptographic authentication of a physical asset according to an example embodiment. One or more operations illustrated in FIG. 4 may be modified, rearranged, or omitted all together. Accordingly, the particular sequence of operations illustrated in FIG. 4 should not be construed as limiting the scope of one or more embodiments.

In an example embodiment, user device 112, via NFC reader 114, obtains a single-use authentication link 106 from a cryptographically-secure NFC chip 104 attached to a physical asset 102 (Operation 410). In an example embodiment, NFC reader 114 must be positioned within 10 cm (or preferably within 4 cm) of cryptographically-secure NFC chip 104.

Then, user device 112 obtains a metadata pointer 108 and a hash digest 109 from the single-use authentication link 106 (Operation 420). Since, in some embodiments, the metadata pointer 108 and hash digest 109 may be cryptographically-embedded within the path of the URL of the single-use authentication link 106, in some embodiments, Operation 420 includes Operations 422 and 424.

In Operation 422, user device 112 requests (e.g., via operation of web browser 116), from a web server 118 (i.e., a web server identified by the domain name portion of the single-use authentication link 106), an authentication page 119 pointed to by the single-use authentication link 106. Then, in Operation 424, web browser 116 loads the authentication page 119 from the web server 118, the authentication page 119 including the metadata pointer 108 and the hash digest 109.

Then, user device 112 obtains, via the metadata pointer 108, metadata 124 associated with the physical asset 102, the metadata 124 including a cryptographic signature 135 (Operation 430). In an example embodiment, Operation 430 includes sending a request to data repository 122 using the metadata pointer 108, in response to which, data repository 122 locates the metadata 124 and returns it to user device 112.

Then, user device 112 obtains a public authentication key 120 associated with the trusted entity (Operation 440). In an example embodiment, Operation 440 includes sending a request to web server 118, in response to which, web server 118 returns the public authentication key 120 to user device 112. In some embodiments, the order of Operations 430 and 440 may be reversed, or Operations 430, 440 may be performed in parallel.

In some embodiments, then user device 112 detects, by the authentication page 119 (e.g., by a script running on the authentication page 119), a user selection of an authentication control 202 (Operation 450), in response to which, Operation 460 is performed. In some embodiments, Operation may precede Operations 430, 440, and Operation 450 may trigger performance of Operations 430, 440, followed by 460.

Then, trusted application 117 authenticates the cryptographic signature 135 against the public authentication key 120 and verifies whether the hash digest 109 is a cryptographic hash of the metadata 124 obtained via the metadata pointer 108 in order to obtain an authentication result for the physical asset 102 (Operation 460). Finally, web browser 116 presents the authentication result in the authentication page 119 to be visible to the user on a screen of the user device 112.

Figure 5:
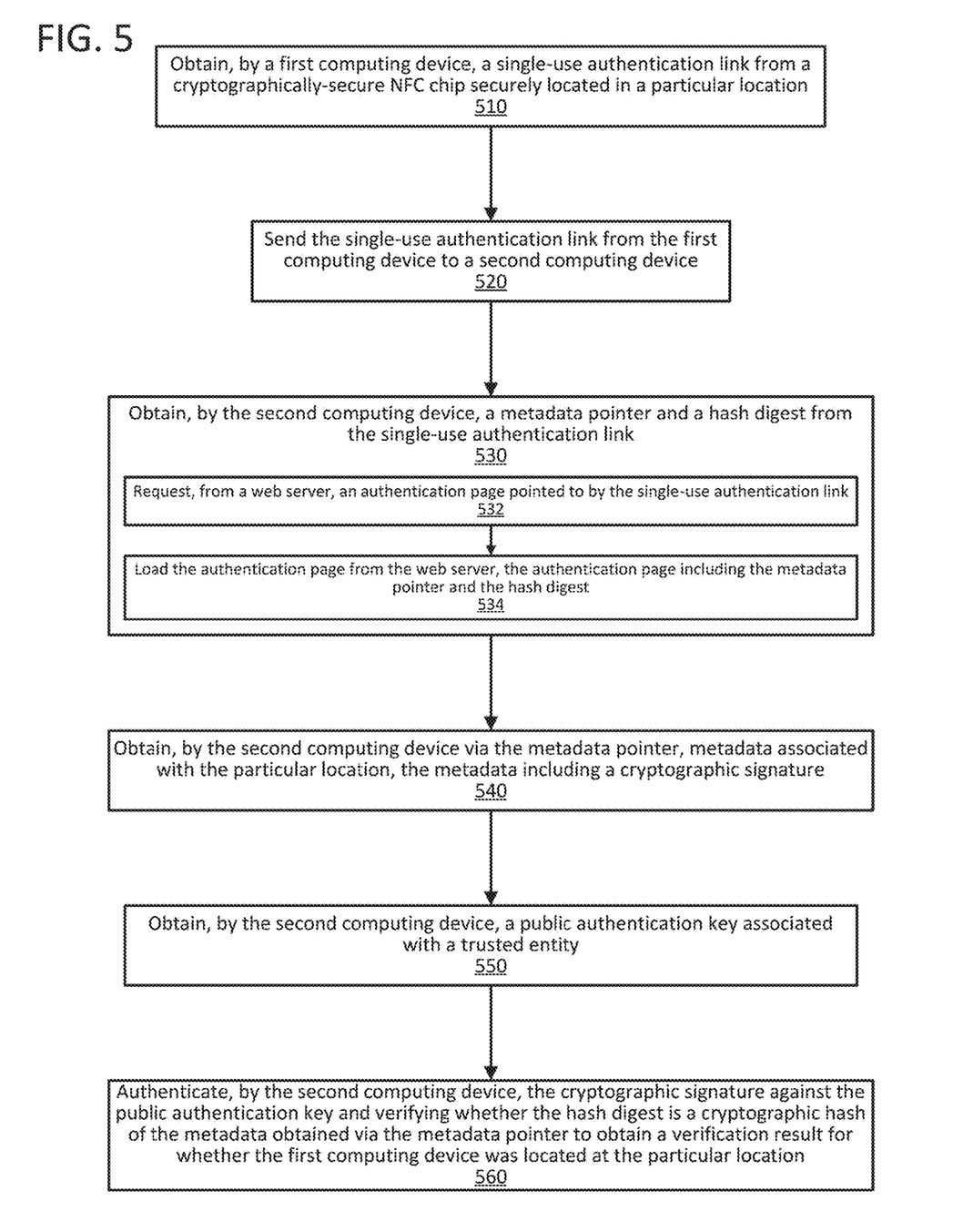
FIG. 5 is a flow diagram of an example of operations for authenticating that a computing device is physically present at a particular physical location according to an example embodiment.

4. Operations for Authenticating that a Device is Physically Located in a Particular Location FIG. 5 is a flow diagram of an example of operations for authenticating that a first computing device is physically present in or immediately adjacent to a particular physical location according to an example embodiment. One or more operations illustrated in FIG. 5 may be modified, rearranged, or omitted all together. Accordingly, the particular sequence of operations illustrated in FIG. 5 should not be construed as limiting the scope of one or more embodiments.

In an example embodiment, a first computing device (e.g., user device 112) obtains a single-use authentication link 106 from a cryptographically-secure NFC chip 104 that is securely located in a particular location 103 (Operation 510). In an example embodiment, NFC reader 114 must be positioned within 10 cm (or preferably within 4 cm) of cryptographically-secure NFC chip 104. In an example embodiment, Operation 510 may be performed by location client application 142.

Then, user device 112 (e.g., location client application 142) sends the single-use authentication link 106 to a second computing device (e.g., remote authentication device 140) (Operation 520).

Upon receiving the single-use authentication link 106, remote authentication device 140 obtains a metadata pointer 108 and a hash digest 109 from the single-use authentication link 106 (Operation 530). Since, in some embodiments, the metadata pointer 108 and hash digest 109 may be cryptographically-embedded within the path of the URL of the single-use authentication link 106, in some embodiments, Operation 530 includes Operations 532 and 534.

In Operation 532, remote authentication device 140 requests (e.g., via operation of location server application 142 or web browser 116 operating on remote authentication device 140), from a web server 118 (i.e., a web server identified by the domain name portion of the single-use authentication link 106), an authentication page 119 pointed to by the single-use authentication link 106. Then, in Operation 534, location server application 142 or web browser 116 loads the authentication page 119 from the web server 118, the authentication page 119 including the metadata pointer 108 and the hash digest 109.

Then, remote authentication device 140 obtains, via the metadata pointer 108, metadata 124 associated with the particular location 103, the metadata 124 including a cryptographic signature 135 (Operation 540). In an example embodiment, Operation 540 includes sending a request to data repository 122 using the metadata pointer 108, in response to which, data repository 122 locates the metadata 124 and returns it to remote authentication device 140.

Then, remote authentication device 140 obtains a public authentication key 120 associated with a trusted entity (Operation 550). In an example embodiment, Operation 550 includes sending a request to web server 118, in response to which, web server 118 returns the public authentication key 120 to remote authentication device 140. In some embodiments, the order of Operations 540 and 550 may be reversed, or Operations 540, 550 may be performed in parallel.

Then, location server application 142 authenticates the cryptographic signature 135 against the public authentication key 120 and verifies whether the hash digest 109 is a cryptographic hash of the metadata 124 obtained via the metadata pointer 108 in order to obtain a verification result for whether the user device 112 was located at the particular location 103 (Operation 560).

It should be understood that the method of FIG. 5 may be performed for several different use cases.

In a first example use case, a game management entity may manage a scavenger hunt, in which various users hunt for various items or locations based on a set of clues. In order to prove that a user has found each item or location, the game management entity may securely embed an NFC chip 104 at each location 103 so that each user may use his/her mobile device to scan that NFC chip 104 and prove to the game management entity that s/he was at that location 103.

In a second example use case, a sweepstakes management entity may manage a promotional sweepstakes, in which customers are encouraged to visit every branch of a chain store or restaurant. Upon visiting every such location, a customer may win a prize or be entered into a drawing. In order to prove that a customer has visited each location, the sweepstakes management entity may securely embed an NFC chip 104 at each location 103 so that each customer may use his/her mobile device to scan that NFC chip 104 and prove to the sweepstakes management entity that s/he was at that location 103.

In a third example use case, a court officer may desire to ensure that all parolees routinely visit their parole officers, as scheduled. An NFC chip 104 may be installed at a parole officer's office so that parolees may scan the NFC chip 104 with their respective mobile devices to prove that they were there.

In a fourth example use case, a bank may wish to see proof of employment prior to issuing a loan to a customer (or a judge may want to see proof of employment in order to verify conditions of parole). An NFC chip 104 may be installed within a respective area at one or more companies that is off-limits to everyone except employees. Thus, by an employee scanning the NFC chip 104 with his/her mobile device within the restricted area, the employee may prove employment by his/her employer to a third party seeking verification (such as a bank or judge).

In a fifth example use case, an employer may wish to see proof that its employees are on premises of the company during working hours. An NFC chip 104 may be installed within an employment area of the company. Employees may be instructed to scan the NFC chip 104 at certain times during their employment hours to prove that they are there when they are supposed to be.

In a sixth example use case, an artist or art dealer may desire to issue an NFT to the first few visitors to view a particular piece of artwork on display at a gallery. An NFC chip 104 may be installed on or near the piece of artwork at the gallery. A visitor to the gallery may be encouraged to scan the NFC chip 104 upon entry. The particular piece of artwork may be subject to a smart contract indicating that a user is able to mint an NFT based on the piece of artwork when in the presence of the artwork, subject to additional conditions. For example, the first visitor (or first N visitors) to scan a particular NFC chip may be able to mint an NFT based on that piece of artwork.

5. General; Computer Systems; Networks

In an example embodiment, a system includes one or more devices, including one or more hardware processors, that are configured to perform any of the operations described herein and/or recited in any of the claims.

In an example embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an example embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an example embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 6:
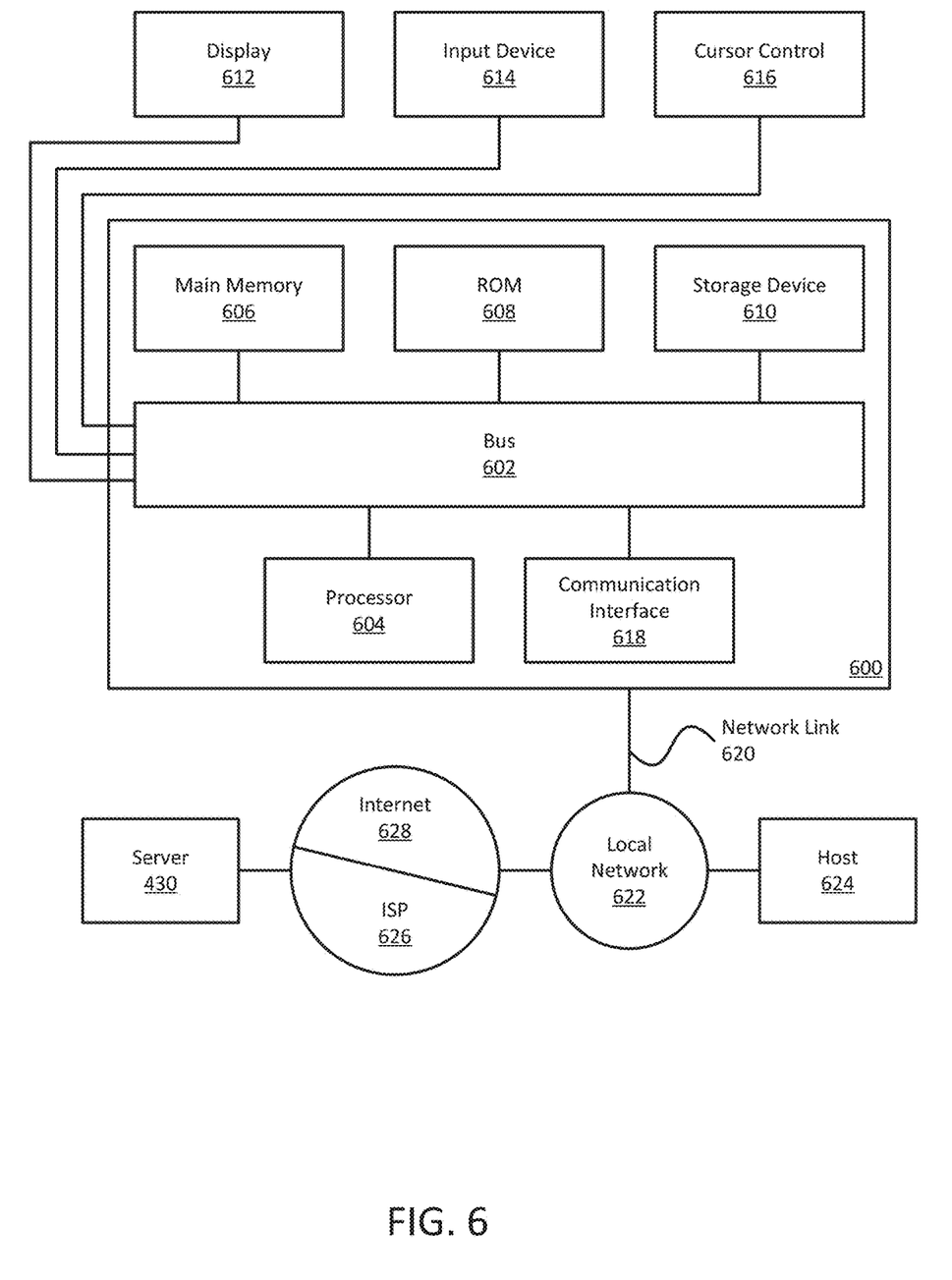
FIG. 6 is a block diagram of an example of a computer system according to an example embodiment.

For example, FIG. 6 is a block diagram of an example of a computer system 600 according to an example embodiment. Computer system 600 includes a bus 602 or other communication mechanism for communicating information, and a hardware processor 604 coupled with the bus 602 for processing information. Hardware processor 604 may be a general-purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in one or more non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display (LCD), plasma display, electronic ink display, cathode ray tube (CRT) monitor, or any other kind of device for displaying information to a computer user. An input device 614, including alphanumeric and other keys, may be coupled to bus 602 for communicating information and command selections to processor 604. Alternatively or additionally, computer system 600 may receive user input via a cursor control 616, such as a mouse, a trackball, a trackpad, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Alternatively or additionally, computer system 600 may include a touchscreen. Display 612 may be configured to receive user input via one or more pressure-sensitive sensors, multi-touch sensors, and/or gesture sensors. Alternatively or additionally, computer system 600 may receive user input via a microphone, video camera, and/or some other kind of user input device (not shown).

Computer system 600 may implement the techniques described herein using customized hard-wired logic, one or more ASICs or FPGAs, firmware, and/or program logic which in combination with other components of computer system 600 causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 602. Transmission media may also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 600 may receive the data from the network and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 430 might transmit a requested code for an application program through Internet 628, ISP 626, local network 622, and communication interface 618.

The received code may be executed by processor 604 as it is received, and/or stored in storage device 610, or other non-volatile storage for later execution.

In an example embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an example embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an example embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an example embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an example embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an example embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an example embodiment, in a multi-tenant computer network, tenant isolation is implemented to ensure that the applications and/or data of different tenants are not shared with each other. Various tenant isolation approaches may be used. In an example embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an example embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. A method comprising operating a trusted application, the trusted application being provided by a trusted entity, on a computing device equipped with a near-field communications (NFC) reader to:
   obtain a single-use authentication link from a cryptographically-secure NFC chip attached to a physical asset;
   obtain a metadata pointer and a hash digest from the single-use authentication link;
   obtain, via the metadata pointer, metadata associated with the physical asset, the metadata including a cryptographic signature;
   obtain a public authentication key associated with the trusted entity; and
   authenticate the cryptographic signature against the public authentication key and verify whether the hash digest is a cryptographic hash of the metadata obtained via the metadata pointer to obtain an authentication result for the physical asset.

2. The method of claim 1 wherein obtaining the metadata pointer and the hash digest from the single-use authentication link includes:
   requesting, from a web server, an authentication page pointed to by the single-use authentication link; and
   loading the authentication page from the web server, the authentication page including the metadata pointer and the hash digest.

3. The method of claim 2, further comprising, presenting the authentication result in the authentication page.

4. The method of claim 1, further comprising:
   detecting, by the authentication page, a user selection of an authentication control; and
   authenticating the cryptographic signature being performed responsive to detecting the user selection of the authentication control.

5. The method of claim 1, the cryptographically-secure NFC chip being attached to the physical asset using a sticker.

6. The method of claim 1, the physical asset being a piece of artwork.

7. A computer program product comprising a non-transitory computer-readable storage medium storing a set of instructions, which, when executed by a computing device equipped with a near-field communications (NFC) reader, cause the computing device to operate a trusted application provided by a trusted entity to:
   obtain a single-use authentication link from a cryptographically-secure NFC chip attached to a physical asset;
   obtain a metadata pointer and a hash digest from the single-use authentication link;
   obtain, via the metadata pointer, metadata associated with the physical asset, the metadata including a cryptographic signature;
   obtain a public authentication key associated with the trusted entity; and
   authenticate the cryptographic signature against the public authentication key and verify whether the hash digest is a cryptographic hash of the metadata obtained via the metadata pointer to obtain an authentication result for the physical asset.

8. The computer program product of claim 7 wherein obtaining the metadata pointer and the hash digest from the single-use authentication link includes:
   requesting, from a web server, an authentication page pointed to by the single-use authentication link; and loading the authentication page from the web server, the authentication page including the metadata pointer and the hash digest.

9. The computer program product of claim 8, wherein the instructions, when executed by the computing device, further cause the computing device to present the authentication result in the authentication page.

10. The computer program product of claim 7, wherein:
the instructions, when executed by the computing device, further cause the computing device to detect, by the authentication page, a user selection of an authentication control; and
authenticating the cryptographic signature is performed responsive to detecting the user selection of the authentication control.

11. The computer program product of claim 7, the cryptographically-secure NFC chip being attached to the physical asset using a sticker.

12. The computer program product of claim 7, the physical asset being a piece of artwork.

13. An apparatus comprising:
an NFC reader and
processing circuitry coupled to memory configured to operate a trusted application provided by a trusted entity to:
obtain a single-use authentication link from a cryptographically-secure NFC chip attached to a physical asset;
obtain a metadata pointer and a hash digest from the single-use authentication link;
obtain, via the metadata pointer, metadata associated with the physical asset, the metadata including a cryptographic signature;
obtain a public authentication key associated with the trusted entity; and
authenticate the cryptographic signature against the public authentication key and verify whether the hash digest is a cryptographic hash of the metadata obtained via the metadata pointer to obtain an authentication result for the physical asset.

14. The apparatus of claim 13 wherein:
the apparatus further includes network interface circuitry communicatively-connected to a network and
obtaining the metadata pointer and the hash digest from the single-use authentication link includes:
requesting, from a web server, via the network interface circuitry, an authentication page pointed to by the single-use authentication link; and
loading the authentication page from the web server, via the network interface circuitry, the authentication page including the metadata pointer and the hash digest.

15. The apparatus of claim 14, wherein the processing circuitry coupled to memory is further configured to present the authentication result in the authentication page.

16. The apparatus of claim 13, wherein:
the processing circuitry coupled to memory is further configured to detect, by the authentication page, a user selection of an authentication control; and
authenticating the cryptographic signature is performed responsive to detecting the user selection of the authentication control.

17. The apparatus of claim 13, the cryptographically-secure NFC chip being attached to the physical asset using a sticker.

18. The apparatus of claim 13, the physical asset being a piece of artwork.

19. A method for a first computing device equipped with a near-field communications (NFC) reader to verify its location to a second computing device, the method comprising:
obtaining, by the first computing device, a single-use authentication link from a cryptographically-secure NFC chip securely located in a particular location;
sending the single-use authentication link from the first computing device to the second computing device;
obtaining, by the second computing device, a metadata pointer and a hash digest from the single-use authentication link;
obtaining, by the second computing device via the metadata pointer, metadata associated with the particular location, the metadata including a cryptographic signature;
obtaining, by the second computing device, a public authentication key associated with a trusted entity; and
authenticating, by the second computing device, the cryptographic signature against the public authentication key and verifying whether the hash digest is a cryptographic hash of the metadata obtained via the metadata pointer to obtain a verification result for whether the first computing device was located at the particular location.

20. The method of claim 19 wherein the particular location is one of a set of locations specified for a scavenger hunt.

21. The method of claim 19 wherein the particular location is one of a set of locations specified for a sweepstakes.

22. The method of claim 19 wherein:
the particular location is an office of a parole officer; and
the first computing device is a mobile device operated by a parolee assigned to the parole officer.

23. The method of claim 19 wherein:
the particular location is an office of an employer, presence within the office being restricted to persons employed by the employer;
the first computing device is a mobile device operated by an employee of the employer; and
the employee initiates the method in order to prove to a third party in control of the second computing device that the employee is employed by the employer.

24. The method of claim 19 wherein:
the particular location is an office of an employer;
the first computing device is a mobile device operated by an employee of the employer; and
the employee initiates the method in order to prove to the employer that the employee was located within the office of the employer during working hours.

25. The method of claim 19 wherein:
the particular location is within an art gallery in which a piece of artwork is stored, the piece of artwork being subject to a smart contract indicating that a user is able to mint a non-fungible token (NFT) based on the piece of artwork when in the presence of the artwork, subject to additional conditions;
the first computing device is a mobile device operated by a person seeking to mint the NFT; and
the method further includes minting the NFT in response to the verification result indicating that the computing device was located at the particular location, subject to the additional conditions.

26. The method of claim 19 wherein obtaining the metadata pointer and the hash digest from the single-use authentication link includes:

requesting, from a web server, an authentication page pointed to by the single-use authentication link; and loading the authentication page from the web server, the authentication page including the metadata pointer and the hash digest.

27. A system comprising:

a first computing device equipped with a near-field communications (NFC) reader, the first computing device being configured to:
- obtain a single-use authentication link from a cryptographically-secure NFC chip securely located in a particular location; and
- send the single-use authentication link from the first computing device to the second computing device; and the second computing device, the second computing device being configured to:
- obtain a metadata pointer and a hash digest from the single-use authentication link;
- obtain, via the metadata pointer, metadata associated with the particular location, the metadata including a cryptographic signature;
- obtain a public authentication key associated with a trusted entity; and
- authenticate the cryptographic signature against the public authentication key and verify whether the hash digest is a cryptographic hash of the metadata obtained via the metadata pointer to obtain a verification result for whether the first computing device was located at the particular location.

28. The system of claim 27 wherein the particular location is one of a set of locations specified for a scavenger hunt.

29. The system of claim 27 wherein the particular location is one of a set of locations specified for a sweepstakes.

30. The system of claim 27 wherein:
the particular location is an office of a parole officer; and
the first computing device is a mobile device operated by a parolee assigned to the parole officer.

31. The system of claim 27 wherein:
the particular location is an office of an employer, presence within the office being restricted to persons employed by the employer;
the first computing device is a mobile device operated by an employee of the employer; and
the employee activates the NFC reader in order to prove to a third party in control of the second computing device that the employee is employed by the employer.

32. The system of claim 27 wherein:
the particular location is an office of an employer;
the first computing device is a mobile device operated by an employee of the employer; and
the employee activates the NFC reader in order to prove to the employer that the employee was located within the office of the employer during working hours.

33. The system of claim 27 wherein:
the particular location is within an art gallery in which a piece of artwork is stored, the piece of artwork being subject to a smart contract indicating that a user is able to mint a non-fungible token (NFT) based on the piece of artwork when in the presence of the artwork, subject to additional conditions;
the first computing device is a mobile device operated by a person seeking to mint the NFT; and
the second computing device is further configured to mint the NFT in response to the verification result indicating that the computing device was located at the particular location, subject to the additional conditions.

34. The system of claim 27 wherein obtaining the metadata pointer and the hash digest from the single-use authentication link includes:
requesting, from a web server, an authentication page pointed to by the single-use authentication link; and
loading the authentication page from the web server, the authentication page including the metadata pointer and the hash digest.

* * * * *